April 22, 1969
J. A. CHAMBERS ET AL
3,439,945
PIPE JOINT SEAL AND METHOD
Filed May 26, 1965
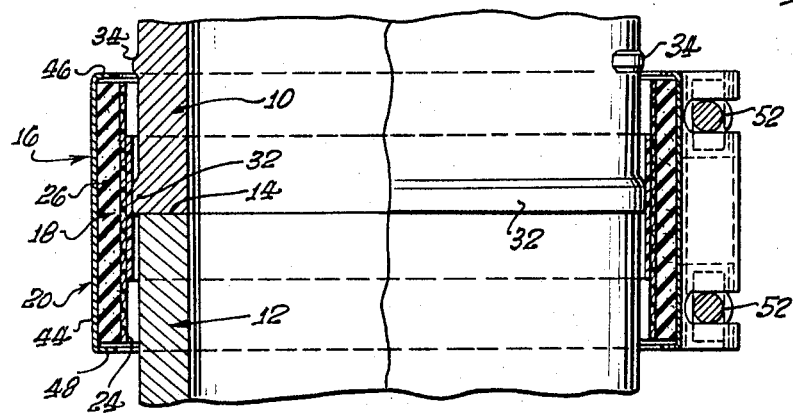
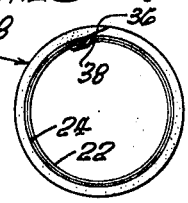
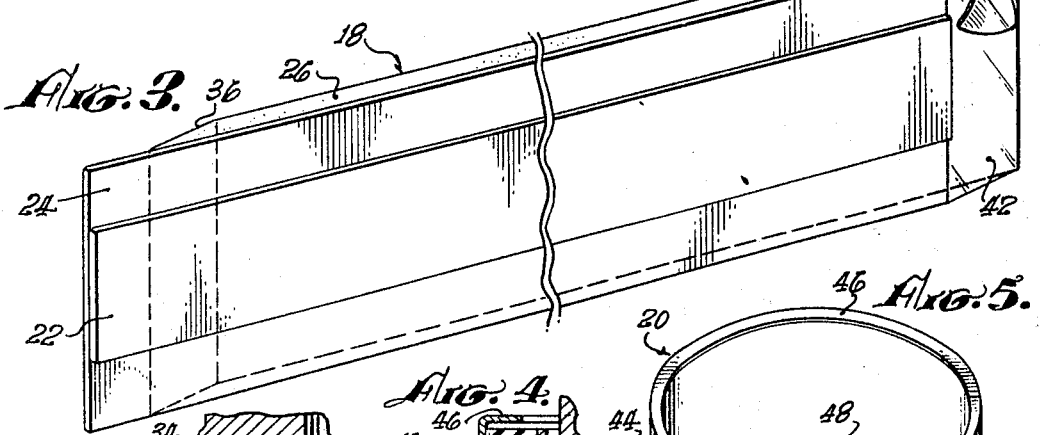
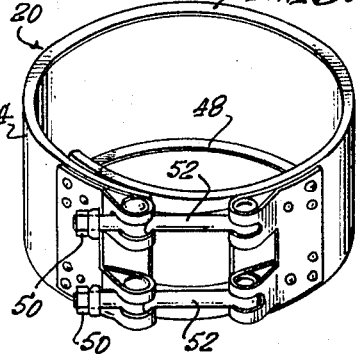
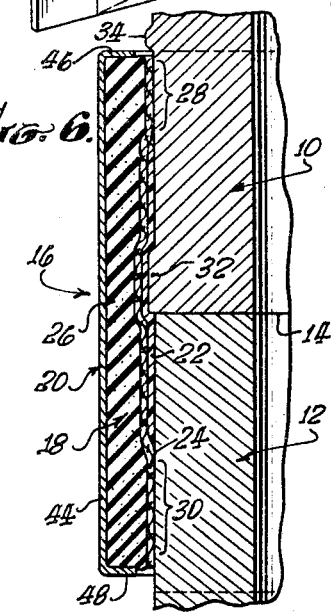
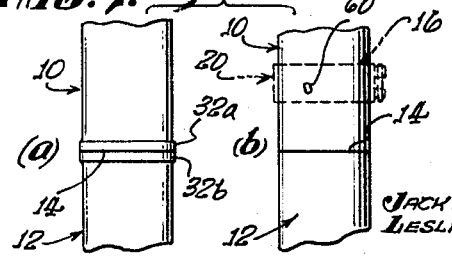
INVENTORS.
JACK A. CHAMBERS,
LESLIE A. WOODSON,
By Smyth, Roston & Pavitt
ATTORNEYS.

United States Patent Office 3,439,945
Patented Apr. 22, 1969

3,439,945
PIPE JOINT SEAL AND METHOD
Jack A. Chambers, Manhattan Beach, and Leslie A. Woodson, Long Beach, Calif., assignors to W. S. Shamban & Company, Culver City, Calif., a corporation of California
Filed May 26, 1965, Ser. No. 459,024
Int. Cl. F16l 21/02
U.S. Cl. 285—373        9 Claims

ABSTRACT OF THE DISCLOSURE

This disclosure describes a pipe seal which may include a layer of unsintered PTFE, a layer of chemically resistant material and a layer of elastomeric material. These layers are adapted to be wrapped around a pipe to seal the pipe against leakage. A suitable clamp may be provided for holding these layers tightly against the pipe.

---

This invention relates to devices, materials and methods for sealing pipe joints formed by pipe sections of a pipeline and, more particularly, to new and more improved devices and methods for sealing pipe joints with polytetrafluoroethylene, conventionally referred to as PTFE. This invention is also directed to the problem of sealing leaks in the pipe sections themselves which may occur or be found after the pipe sections have been made up into a pipeline and the joints between the pipe sections sealed against leakage.

It has long been customary to form sections of large pipe with a bell or flare on one end so that when the sections are placed adjacent one another in axial alignment to form a long pipeline, the unflared ends of the pipe sections are inserted into the flared ends of adjacent pipe sections, thus forming pipe joints therebetween. These joints were then sealed by filling the bells or flares with a suitable sealing material such as okum and lead.

More recently, in order to reduce the time required for sealing pipe joints and to meet the needs of the industry for a chemical resisitant seal, the bell or flare type pipe sections have not been used, and a pipeline is formed simply by placing adjacent ends of the pipe sections in abutting relationship and sealing the joints therebetween. The seal of the joints has been made by brushing the end of the pipe sections with a paste of unsintered PTFE and sliding a pair of bands—one of sintered PTFE and the other of rubber—over the paste material and clamping the bands and paste material tight over the joint to make it leakproof.

While in most instances a joint sealed by this prior arrangement was satisfactory, a good seal depended upon the skill and technique of brushing on the unsintered PTFE, otherwise a good seal was not made and the bands, being continuous rings, had to be inserted over the pipe sections before the latter were placed in abutting relationship. With this arrangement, if a leak occurred in one joint after a number of joints had been sealed, it was necessary for the leaky joint and the joint on the opposite end of one of the pipe sections to have their respective clamps removed, and the joints opened so that two new pairs of continuous bands could be placed on one of the pipe sections before the leaking joint and the adjacent joint could be resealed.

This breakage of the seals of two joints when only one leaked was necessary because the pairs of bands, being continuous rings, could be placed over the end of a pipe section only by moving one section of the pipe a sufficient distance out of the way of its adjacent pipe section to permit the bands to be slid over the pipe section. In moving one pipe section this distance, however, an adjacent joint was necessarily disturbed and had to be resealed. Unfortunately, as one would have otherwise normally expected, this method of sealing a leaky joint could not be improved by the simple expedient of splitting the bands to insert them over one joint without moving one pipe section because it was found that split bands would not properly seal. In other words, the efficiency of this prior seal depended upon the continuity of the bands as much as anything else.

Thus, it should also be clear that the prior sealing arrangement had still another deficiency. This prior sealing arrangement could not be used to repair a leak in a pipeline where the leak occurred, or was found to exist, after the pipeline was made up inasmuch as the success of this prior sealing arrangement depended on the continuity of the bands. Thus, to repair a leaky pipe section by such prior sealing arrangement, either the leaky pipe section had to be removed and replaced, or at least it had to be moved so that the continuous bands could be slipped over one end of the pipe section. This, as in the case of repairing a leaky joint, of course, necessarily required the joints at both ends of the pipe sections to be resealed.

In addition to the drawback of relying on the skill of the person brushing the unsintered PTFE on the abutting pipe sections and the drawback of the requirement that another and probably good seal joint had to be broken in order to fix one leaky joint or to fix a leaky pipe section, there exists still another deficiency in this prior arrangement. This deficiency is the fact that such prior seals were unable to withstand the forces imposed on the pipe sections in a closed pressure system without undue motion of the pipe sections away from each other. This is undesirable in a long pipeline because it will elongate the pipeline and cause leakage in another pipeline to which the elongated pipeline is connected by causing the other pipeline to move transversely and break one or more seals at the pipe joints.

More specifically, in a pipeline in which there is fluid under pressure, there is a force imposed on the ends of adjacent pipe sections which urges the sections apart at the joint, and the component parts of the prior sealing arrangement did not have the structural strength to withstand this force to stop the aforesaid elongation of the pipeline. In operation, this force caused the sintered PTFE band of this prior sealing arrangement to stretch in width. Actually, this force was sufficient to cause this band to stretch in width even though these bands were made so that the higher modulus of elasticity of the sintered PTFE (a well-known phenomenon in sintered PTFE) would be across the width of the band so as to be in direct opposition to the forces imposed on the ends of the pipe sections. Furthermore, inasmuch as the prior band of sintered PTFE was not directly engaging the pipe sections but was engaging the slippery unsintered PTFE paste, there was a tendency for the sealing arrangement to slip on the pipe.

The invention herein which overcomes the afore-mentioned drawbacks comprises utilizing an elongated strip or segment of material which includes three layers—a narrow layer of unsintered PTFE; a layer of woven material, preferably a woven glass cloth impregnated with sintered PTFE, and wider than the layer of unsintered PTFE; and a layer of compressible elastomeric material, preferably Neoprene which is also wider than the layer of unsintered PTFE. This elongated strip is pre-cut to a length corresponding to the circumference of the particular pipe sections about which it is wrapped so that when wrapped around the abutting ends of the adjacent pipe sections, the ends of the strip overlap with the elastomeric material on each end of the strip in contacting relationship to form a continuous compressible band over the pipe joint. The clamp is then placed over this compressible band and tightened to force the woven material against the outer surfaces of the pipe sections and to cause the unsintered PTFE to flow into all pits and irregularities in the pipe surfaces and between the crevices near the joint so that a fluid-tight, relatively immovable seal is formed.

The invention, as above described, can be utilized to repair a leaky pipe section by wrapping the elongated strip of this invention around the circumference of the pipe at the place where the leak occurs to form a band and clamping the band to force the unsintered PTFE to flow into the hole in the pipe section to seal the leak.

The present invention overcomes the drawbacks of the prior pipe seals in the following manner.

First, the strip or segment of material as distinguished from the continuous band or ring of the prior sealing devices can be wrapped around the pipe joint to form a band without the necessity of slipping the band over one of the sections before the latter are placed in abutting relationship with each other as was the case in the prior devices. Too, if one of the sealed joints is found to be leaking, this strip or segment can be removed just as easily as when originally installed and replaced without destroying any of the rest of the sealed joints in the pipeline. The advantage of being able to wrap the strip around the pipe joint to form a band without disturbing the pipe sections can also be utilized to repair a leak in one or more of the pipe sections without disturbing the joints between adjacent pipe sections.

Secondly, inasmuch as the strip is provided with a layer of unsintered PTFE prefabricated at the factory where its dimensions and consistency can be controlled, the guesswork and unreliability of painting the unsintered PTFE on the pipe are eliminated.

Thirdly, inasmuch as the strip is provided with a layer of woven material, preferably a glass cloth impregnated with PTFE, the band is sufficiently strong to resist spreading by the forces within the pipeline tending to separate the sections apart. Too, inasmuch as the unsintered PTFE is narrower than the woven material and the elastomeric material, the clamp urges the woven material against the pipe surface so that there is a resistance to slippage, which resistance is not found in the prior devices where the clamped sintered PTFE engages the unsintered PTFE paste. In addition, this woven layer also provides a chemical barrier to prevent any chemicals in the fluid in the pipeline from reacting on the elastomeric material.

Fourth, the clamp utilized with the aforesaid strip is preferably formed in practice with peripheral flanges which extend toward the pipe joint when the band is in place so that when the band is clamped, the elastomeric material and the woven material are not only urged against the pipe, but are also contained by the flanges beneath the clamp. This containment is important inasmuch as the entire compressive forces available by the reaction of the clamp on the elastomeric material are then directed against the pipe to form a leakproof seal which can resist the tendency of the pipe sections to move apart.

In addition to the above, another advantage of this invention is that the above mentioned ends of the elastomeric material, which overlap to form a complete compressible ring, are tapered to complement one another so that when in place, the layer of elastomeric material is of uniform thickness throughout. In addition, one end of the elastomeric material is provided with an adhesive so that the ends will adhere to one another when in position about the pipe. In this manner, the clamp can then be conveniently placed over the band to complete the sealing operation without the drawback in the prior arrangement of attempting to handle both the band of unsintered PTFE and the band of rubber at the same time the clamp is placed thereover.

Finally, another advantage in the present invention is that it seals joints between an leaks in pipe sections of any type of material whether glass, brass, steel, iron, lead, ceramic or other material with a very minimum of skill required.

Other and additional features and advantages of the present invention will become apparent from a more detailed description considered with the drawings, wherein:

FIGURE 1 is an elevational, cross-sectional view illustrating the invention disposed about a joint between pipe sections before the clamp is tightened about the band;

FIGURE 2 is a plan, cross-sectional view of the sealing strip as it forms a band around the pipe joint;

FIGURE 3 is a perspective view of a sealing strip or segment of band forming the invention herein;

FIGURE 4 is a fragmentary showing of the band and clamp as shown in FIGURE 1, but enlarged to show the details thereof;

FIGURE 5 is a perspective view of a band clamp utilized in practicing the invention rerein;

FIGURE 6 is a partial elevational sectional view showing the band in tightened position to form the sealed joint; and FIGURE 7 illustrates examples of different pipe joints which may be sealed by the present invention and shows the invention sealing a hole in a pipe section itself.

Turning now to FIGURES 1 and 6, it can be seen that a pair of pipe sections 10 and 12 placed in abutting relationship form a joint 14 to be sealed by a pipe joint seal constructed in accordance with the teachings of the present invention; the latter being indicated in its entirety as 16.

The pipe joint seal 16 comprises a sealing strip or segment 18, shown flat in FIGURE 3 but which in use forms a band around joint 14, and a cylindrical ring type clamp 20 for clamping the band into fluid-tight engagement with the pipe sections to seal the joint.

Sealing strip 18 comprises a layer 22 of unsintered PTFE; a layer of chemical and stretch resistant material 24, preferably a woven glass cloth impregnated with sintered PTFE; and a layer 26 of elastomeric material such as Neoprene. These layers adhere to one another by use of suitable adhesives, preferably of the pressure sensitive type, placed between the layers. In the preferred practice of the invention, layer 22 is narrower than the other two layers so that when the strip is wrapped around the joint to form a band, layer 24 will be urged into contact with the outer surfaces of the pipe sections above and below the joint, as illustrated a 28 and 30 in FIGURE 6.

The purpose of providing the wider layers 24 and 26 is to take advantage of the higher coefficient of friction of sintered PTFE in the layer 24 so that when the band is pressed onto the outer surfaces of the pipe, there will be less tendency for slippage axially of the pipe sections when subject to force such as, for example, when the pipe sections are under pressure from the fluid within the pipeline. Otherwise, if the layer 22 of unsintered PTFE were wide enough to cover the full width of layer 24, layer 22 having a low coefficient of friction would be unable to resist the tendency of the band and clamp to slip due to the aforesaid pressure.

As illustrated in FIGURES 1 and 6, the sealing strip 18 when wrapped around the pipe sections is of a width sufficient to overlie any flanges, such as flange 32, which may be formed on one end of the pipe sections, and is preferably of suitable width so that its edges are spaced within any locating beads, such as beads 34, which may have been formed on the pipe sections to locate the center of the band with respect to the pipe joint. In this position, the narrower layer 24 of unsintered PTFE straddles the joint and is in contact with the pipe sections completely around the pipe, as illustrated in FIGURE 2.

FIGURES 2 and 3 also illustrate the overlapping of the two layers 24 and 26 to form a continuous wrapper of layers and the complementary tapered surfaces 36 and 38 formed on each end of the elastomeric material to maintain a uniformity of thickness in the band around the pipe. One tapered end such as 38 may be provided with a suitable adhesive 40, preferably of the pressure sensitive type and a protective cover 42, the latter being easily removable to expose the adhesive before the strip is wrapped around the pipe. This pressure sensitive adhesive on the tapered surface 38 causes the two tapered ends to adhere to one another and serves the useful purpose of temporarily holding the band in its wrapped condition around the pipe to give more freedom to handle the clamp.

Clamp 20, as illustrated in FIGURES 1, 5 and 6, has a web 44 and a pair of flanges 46 and 48 on each edge of the web, the latter extending in a direction toward the center of the clamp, that is, toward the pipe sections when he clamp is on the pipeline so that the clamp contains the band within the confines of the web and flanges. The clamp which in the embodiment illustrated is conventional and provided with tightening means such as nuts 50 and screws 52. This tightening means, of course, permit the clamp to be opened wide enough to be slipped over or wrapped around the band 18 to contain the band within the web and flanges, as illustrated in FIGURE 1.

In practicing the preferred method of the invention, after the protective cover 38 is removed from the tapered end 34, the band is wrapped around the joint 14 such as illustrated in FIGURES 1 and 2 with the tapered ends 36 and 38 pressed together to maintain the sealing strip in band form through the function of the aforesaid adhesive. Thereafter, the clamp 20 is placed over the band 18 with the web and flanges 44–48 loosely containing the band. As the clamp is tightened about the joint, the unsintered PTFE is caused to flow by the pressure of the compressible elastomeric layer 26 into all pits, crevices and irregularities in the pipe surfaces. It should be noted that in the preferred embodiment of the clamp, the flanges extend inwardly approximately two-thirds of the thickness of the Neoprene layer before the clamp is tightened; then, as the clamp is tightened, these flanges move closer to the pipe surfaces but contain the elastomeric layer and the layer of woven material within its confines. The advantage of this construction is that the entire force of the clamp is directed through the elastomeric layer which, in turn, forces the woven material to grip the pipe surfaces in circumferential areas 28 and 30 so that the band is not only in fluid-tight relationship with the joint, but frictionally engages the pipe sections.

From the foregoing, it is apparent that the elastomeric material provides a cushion between the clamp and the pipe sections to force the layer of sintered PTFE into all surface irregularities and crevices at the pipe joints and causes the unsintered PTFE and woven material to conform to the contour of the pipe sections. Thus, a band and clamp so constructed will not only seal joints as illustrated in FIGURES 1 and 6, but will also seal joints where each pipe section has a flange such as 32a and 32b in (a) of FIGURE 7 as well as pipe joints formed of pipe sections without flanges such as shown in (b) of FIGURE 7.

From the above description of the materials, devices and methods forming this invention, it can be appreciated that should a leak occur in any joint in the pipeline, the leaky joint can be repaired by simply loosening the clamp 20 and removing it from the joint 14, then removing the original sealing strip 18 and replacing it with a new sealing strip and repeating the method above described. It is not necessary to remove more than one sealing strip to perform the repairing operation becasue the strip is not a continuous ring as in the base of the prior sealing joint arrangements.

Furthermore, from the foregoing, it should also be appreciated that should a leak occur in any pipe section, the leak can be repaired by simply wrapping a sealing strip around the pipe section at the opening such as 60 in FIGURE 7(b) where the leak occurs so as to straddle the opening 60 and clamping the strip with a clamp in the manner described above. It is not necessary to remove any seals around the joints at the ends of the leaky pipe section because the strip is not a continuous ring as in the case of the prior sealing arrangements.

As used in one practice of this invention, layer 22 is an unsintered PTFE layer preferably of the thickness of about 0.02 inch, such layer having a density in the range of about 1.2–1.8 (normally about 1.6) and is relatively slippery, possessing a low coefficient of friction and a high degree of lubricity, is soft, compressible and can be stretched easily with the result that it enters any irregularity or roughness in the surface of the pipe sections, whether the pipe sections are of steel, brass, iron, lead, ceramic, glass or other material. This unsintered PTFE forming this layer is fabricated without reaching the fusion or sintering temperature by essentially a cold compress or extrusion process of bulk, unsintered PTFE.

In this same practice of the invention, the layer 24 is preferably of a thickness of about 0.01 inch and is a woven glass cloth, impregnated with sintered PTFE, that is, PTFE which has been subjected to heat above the fusion or sintering temperature to cause the particles to coalesce and fuse together so that the PTFE has a density of about 2.2 as compared to the 1.2–1.8 density of the unsintered material and has a more dense and uniform structure than the unsintered PTFE and permits the sintered PTFE to be attached to the elastomeric layer.

The woven material impregnated with sintered PTFE that is used in this same practice is available from a number of manufacturers, one such type of material is sold under the trademark "Armalon" by the E. I. du Pont de Nemours & Company of Wilmington, Del. It should also be understood that while the glass woven cloth impregnated with sintered PTFE is preferred, the layer 24 can be any material which would satisfactorily perform at the place of intended use of this invention. For example, the woven material could be Dacron and impregnated with polypropylene. What is important is that the layer be stretch resistant so as not to be overcome by the forces tending to cause the pipe sections to move apart and that the layer be chemically resistant to the fluid contained within the pipeline to prevent any reaction on the elastomeric material. Thus, it is within the scope of this invention to have this layer, in fact, formed of two layers such as, for example, a layer of woven glass material and a layer of sintered PTFE in lieu of the cloth embedded in the PTFE as earlier described herein.

Finally, in this same practice of the invention, the elastomeric layer 26 is about 0.09 inch thick and in practice is preferably made of Neoprene, but any suitable elastomer may be used depending upon the conditions under which the band is to be used.

It should be clearly understood that the above layer thickness dimensions for the foregoing illustrative practice of the invention are disclosed herein by way of example only and not intended to be limitations of thicknesses of layers to those practicing the invention disclosed and claimed herein, which thicknesses can vary depending upon the conditions under which the band is to be used and on the desires of the user.

While only a single embodiment of the present invention is disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. In a pipe seal for sealing a region of a conduit means subject to leakage, the combination of:

a band extending generally circumferentially around the conduit means and covering the region thereof which is subject to leakage, said band including a layer of unsintered PTFE surrounding the region of the conduit means in contact therewith to seal said region against leakage, a layer of chemically resistant material surrounding said layer of unsintered PTFE, and a layer of elastomeric material surrounding said chemically resistant layer; and a clamp extending circumferentially around said band and urging said band radially inwardly to cause the layer of unsintered PTFE to conform to the surface contour of the pipe to cause tight sealing engagement therebetween.

2. A combination as defined in claim 1 wherein said chemically resistant layer comprises glass cloth impregnated with sintered PTFE.

3. A combination as defined in claim 1 wherein said chemically resistant layer extends axially of the conduit means beyond the ends of said layer of unsintered PTFE and into engagement with the conduit means, said chemically resistant layer protecting said elastomeric layer against chemical attack by the substance carried by said conduit means.

4. A combination as defined in claim 1 wherein said clamp has a width at least as great as the width of said layer of elastomeric material, and has substantially continuous flanges extending radially inwardly closely adjacent the edges of the layer of elastomeric material to substantially confine said elastomeric material against axial expansion when said clamp urges said band radially inwardly.

5. A combination as defined in claim 1 wherein the conduit means includes first and second pipes and the region subject to leakage includes the joint between said pipes.

6. In a pipe seal for sealing a region of a conduit means subject to leakage, the combination of:

a generally flexible band adapted to be wrapped around the conduit means at the region thereof subject to leakage to seal the region against leakage;

said band including an inner layer of unsintered PTFE engageable with said region of the conduit means when the band is wrapped therearound to seal said region against leakage, said layer of unsintered PTFE having a pair of edges, a layer of chemically resistant material adhered to said layer of unsintered PTFE, said chemically resistant layer being wider than said unsintered layer of PTFE and extending beyond the edges thereof, the portions of said chemically resistant layer which extend beyond the edges of the layer of unsintered PTFE being engageable with the conduit means when said band is wrapped therearound to further improve the seal, and a layer of elastomeric material adhered to said chemically resistant layer and having a width greater than the width of said layer of unsintered PTFE, said chemically resistant layer protecting said elastomeric layer against chemical attack by the substance within the conduit means; and a clamp engageable with said elastomeric layer of said band for tightening said band around the conduit means to establish a fluid-tight seal and for maintaining said band in fluid-tight sealing relationship with said conduit means.

7. In a pipe seal for sealing a region of a conduit means subject to leakage, the combination of:

an at least substantially flexibile sealing band adapted to be wrapped around the conduit means at the region subject to leakage to cover and seal such region of the conduit means;

said flexible band including a layer of unsintered PTFE, a layer of elastomeric material, and an intermediate layer intermediate said layers of unsintered PTFE and elastomeric material;

said layers of unsintered PTFE and said intermediate layer being of substantial length to completely surround the conduit means and of substantial width to cover the region subject to leakage, said intermediate layer and said elastomeric layer each having a width greater than the width of said layer of unsintered PTFE, said band being adapted to be wrapped around the conduit means with the layer of unsintered PTFE and said intermediate layer contacting the conduit means to seal the latter.

8. A combination as defined in claim 7 wherein said intermediate layer comprises a woven material having sintered PTFE impregnated therein, said woven material substantially preventing stretching of the flexible band.

9. A combination as defined in claim 7 wherein the elastomeric layer is offset from the intermediate layer to define an end portion of the elastomeric layer, said end portion being adhesively engageable with the opposite end portion of the elastomeric layer when the band is wrapped around the conduit means.

References Cited

UNITED STATES PATENTS

| | | | |
|---|---|---|---|
| 1,931,922 | 11/1933 | Damsel et al. | |
| 3,100,658 | 8/1963 | Miller et al. | 285—235 X |
| 3,212,798 | 11/1965 | Lewis et al. | 285—230 |
| 1,823,974 | 9/1931 | Ferguson | 285—293 |
| 2,888,042 | 5/1959 | St. John et al. | 138—55 |
| 3,002,770 | 10/1961 | Chesnut et al. | 285—94 |
| 3,104,898 | 9/1963 | MacDonald et al. | 285—236 |
| 3,233,907 | 2/1966 | Stanton | 285 |
| 3,235,293 | 2/1966 | Condon | 285—233 |

MARION PARSONS, JR., *Primary Examiner.*

DAVE W. AROLA, *Assistant Examiner.*

U.S. Cl. X.R.

138—99; 285—423